US010885665B2

(12) United States Patent
Masuda et al.

(10) Patent No.: US 10,885,665 B2
(45) Date of Patent: Jan. 5, 2021

(54) ANALYSIS APPARATUS AND ANALYSIS METHOD (71) Applicant: ARKRAY, Inc., Kyoto (JP)

(72) Inventors: Shigeki Masuda, Kyoto (JP); Yukio Watanabe, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 192 days.

(21) Appl. No.: 16/057,902

(22) Filed: Aug. 8, 2018

(65) Prior Publication Data
US 2019/0051011 A1 Feb. 14, 2019

(30) Foreign Application Priority Data

Aug. 10, 2017 (JP) .................................. 2017-155421
May 24, 2018 (JP) .................................. 2018-099790

(51) Int. Cl.
*G06T 7/73* (2017.01)
*G01N 15/14* (2006.01)

(52) U.S. Cl.
CPC ............ *G06T 7/74* (2017.01); *G01N 15/147* (2013.01); *G01N 15/1429* (2013.01); *G01N 15/1434* (2013.01); *G01N 15/1459* (2013.01); G01N 2015/144 (2013.01); G01N 2015/1445 (2013.01)

(58) Field of Classification Search
CPC .. G06T 7/74; G01N 15/1429; G01N 15/1434; G01N 15/1459
See application file for complete search history.

(56) References Cited

U.S. PATENT DOCUMENTS

| 9,989,470 B1* | 6/2018 | Pangarkar .......... G01N 21/4738 |
| 2002/0071121 A1* | 6/2002 | Ortyn ..................... C07K 1/047 356/419 |
| 2005/0109950 A1 | 5/2005 | King |
| 2005/0174572 A1 | 8/2005 | Czarnek |

(Continued)

FOREIGN PATENT DOCUMENTS

| DE | 10 2014 017 552 A1 | 4/2016 |
| JP | H06-288895 A | 10/1994 |
| WO | 2016/058699 A1 | 4/2016 |

OTHER PUBLICATIONS

The extended European search report issued by the European Patent Office dated Dec. 20, 2018, which corresponds to European Patent Application No. 18188095.6-1001 and is related to U.S. Appl. No. 16/057,902.

*Primary Examiner* — Kim Y Vu
*Assistant Examiner* — Molly Delaney
(74) *Attorney, Agent, or Firm* — Studebaker & Brackett PC (57) ABSTRACT Detection and analysis of a tangible component in a sample are implemented at lower cost. Provided is an analysis apparatus including a flow cell which includes a flow path for a sample, a branch section configured to cause light having passed through the flow path to branch at least to a first optical path and a second optical path, a first imaging section and a second imaging section configured to capture images of the sample in the flow path by using the light in the first optical path and the light in the second optical path, and a controller configured to process the captured images. The first imaging section and the second imaging section capture images that have the same angle of view but have different characteristics.

10 Claims, 8 Drawing Sheets (56) References Cited

U.S. PATENT DOCUMENTS

| | | | |
|---|---|---|---|
| 2011/0220775 A1* | 9/2011 | Triener | G01N 21/6428 250/201.1 |
| 2013/0169948 A1 | 7/2013 | Xie et al. | |
| 2015/0285795 A1* | 10/2015 | Esfandiari | G01N 33/56983 506/18 |
| 2017/0315039 A1 | 11/2017 | Beil et al. | |
| 2018/0311671 A1* | 11/2018 | Cook | B01L 3/502707 |
| 2019/0033291 A1* | 1/2019 | Okada | G01N 1/10 |
| 2019/0270036 A1* | 9/2019 | Zhou | G01N 33/491 |

\* cited by examiner

ANALYSIS APPARATUS AND ANALYSIS METHOD

CROSS REFERENCE TO RELATED APPLICATIONS

This application claims the benefit of Japanese Patent Application No. 2017-155421, filed on Aug. 10, 2017, and Japanese Patent Application No. 2018-099790, filed on May 24, 2018, which are hereby incorporated by reference herein in their entirety.

BACKGROUND

1. Technical Field

The present disclosure relates to an analysis apparatus and an analysis method.

2. Description of the Related Art

It is conceived that, in a test of collected urine, a urine sample flowing in a flow path of a flow cell formed of a transparent member s imaged through the wall of the flow cell. For example, there is known a method that performs analysis of a sediment component in urine (a tangible (solid) component in urine such as a blood cell, an epithelial cell, a cast, bacteria, or a crystal) by imaging a urine sample that flows in a flow path provided in a flow cell and analyzing a captured image (see, e.g., Japanese Patent Application Publication No. H06-288895). In a device described in Japanese Patent Application Publication No. H06-288895, the sediment component in the urine sample that passes through a detection area is detected using a detector and, and after a lapse of delay time, a pulsed light source is caused to emit light in an imaging area positioned downstream of the detection area and the sediment component is imaged.

PRIOR ART LITERATURE

Patent Literature

Patent Literature 1: Japanese Patent Application Publication No. H06-288895

SUMMARY

However, the speed of flow of the sediment component in the central part of the flow path of the flow cell is different from the speed thereof in the vicinity of the wall surface of the flow cell, and hence the passage position of the sediment component in the flow cell is detected, and the delay time is adjusted using the passage position. Consequently, control becomes complicated. In addition, it becomes necessary to provide an optical system for detecting the sediment component in the detection area and another optical system for imaging the sediment component in the imaging area, and hence the structure of the device becomes complicated, and its manufacturing cost is increased.

An object of the present disclosure is to implement detection and analysis of a tangible component in a sample at lower cost.

An aspect of the present disclosure is an analysis apparatus including: a flow cell which includes a flow path for a sample containing a tangible component; a branch section configured to cause light having passed through the flow path to branch at least to a first optical path and a second optical path; a first imaging section and a second imaging section configured to capture images of the sample in the flow path by using the light in the first optical path and the light in the second optical path; and a controller configured to process the captured images, wherein the first imaging section and the second imaging section is further configured to capture images that have the same angle of view but have different characteristics.

In addition, another aspect of the present disclosure includes a method corresponding to the above-described analysis apparatus.

According to the present disclosure, it is possible to implement the detection and analysis of the tangible component in the sample at lower cost.

DESCRIPTION OF THE PREFERRED EMBODIMENTS

Hereinbelow, with reference to the drawings, preferred embodiments of the present disclosure will be described. It should be noted that, however, unless otherwise specified expressly, the dimensions, materials, shapes, and relative arrangements of components described in these embodiments are not intended to limit the scope of the present disclosure to the dimensions, materials, shapes, and relative arrangements thereof.

First Embodiment

Figure 1:
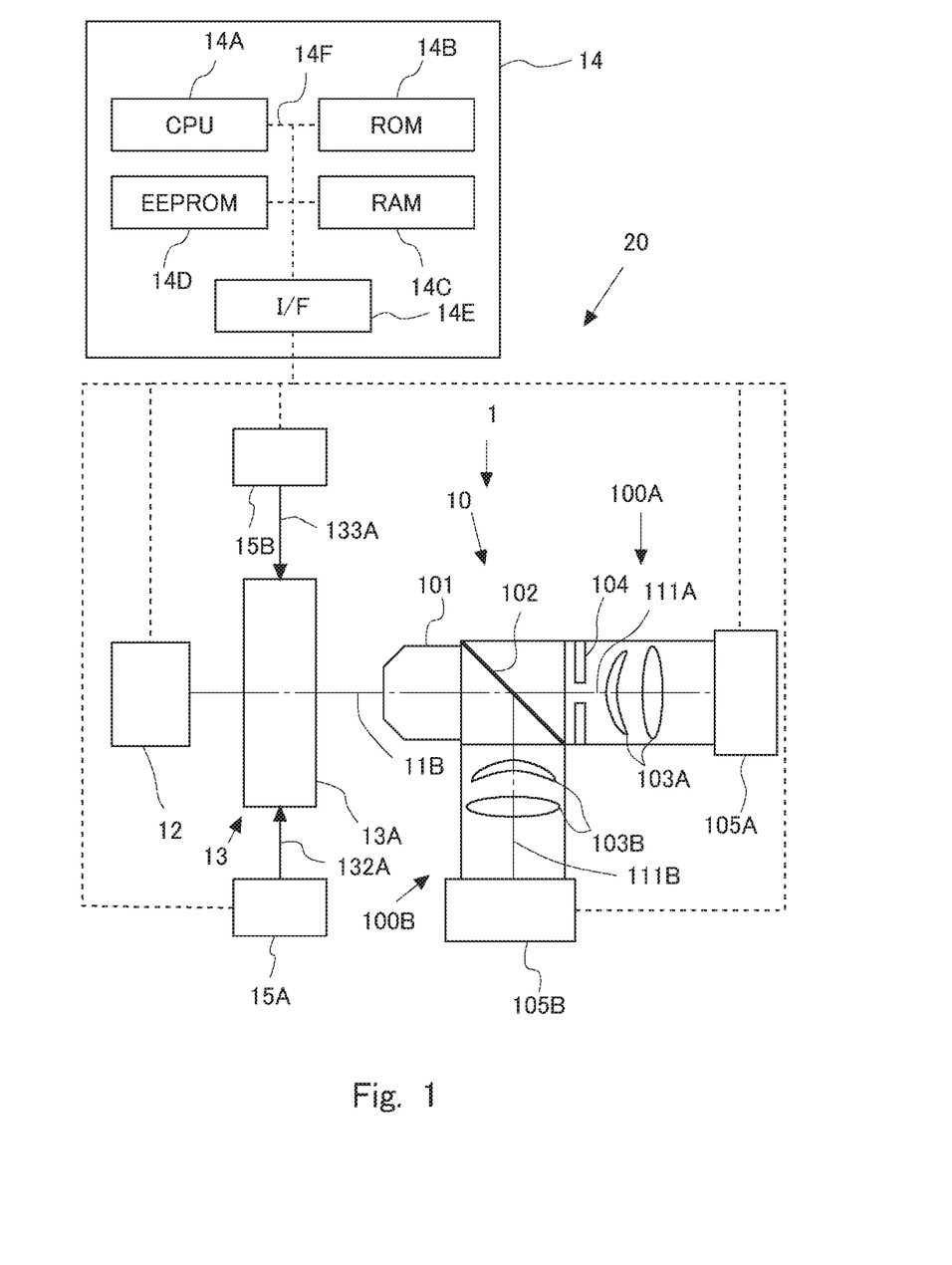
FIG. 1 is a view showing the schematic configuration of an analysis apparatus according to a first embodiment.

FIG. 1 is a view showing the schematic configuration of an analysis apparatus 20 according to a first embodiment. The analysis apparatus 20 includes an imaging device 1. The imaging device 1 images, e.g., urine as a sample, and performs analysis of, e.g., a tangible component in the urine by analyzing the captured image. Note that the imaging device 1 can also be applied to the analysis of the tangible component in a fluid sample other than urine such as, e.g., blood or body fluid.

The imaging device 1 includes an imaging section 10 that images a sample, a light source 12 for imaging, and a flow cell unit 13. The flow cell unit 13 includes a stage (not shown) that fixedly disposes a flow cell 13A in which a sample flows. The flow cell 13A may be attachable to and detachable from the stage.

The imaging device 1 includes an objective lens 101, a branch section 102, a first lens group 103A, a second lens group 103B, a mask 104, a first camera 105A, and a second camera 105B. Each of the first camera 105A and the second camera 105B performs imaging by using an image sensor such as, e.g., a charge coupled device (CCD) image sensor or a complementary metal oxide semiconductor (CMOS) image sensor. Hereinafter, the objective lens 101, the branch section 102, the first lens group 103A, the mask 104, and the first camera 105A are collectively referred to as a first imaging section 100A, and the objective lens 101, the branch section 102, the second lens group 103B, and the second camera 105B are collectively referred to as a second imaging section 100B. Each of the first lens group 103A and the second lens group 103B includes an eyepiece and, in some cases, further includes an imaging lens. The flow cell 13A is disposed between the light source 12 and the objective lens 101, and the light source 12 and the objective lens 101 are shared by the first imaging section 100A and the second imaging section 100B.

The analysis apparatus 20 is provided with a controller 14 serving as a control means. The controller 14 includes a CPU 14A, a ROM 14B, a RAM 14C, an EEPROM 14D, and an interface circuit 14E which are connected to each other using a bus 14F.

The central processing unit (CPU) 14A operates based on a program that is stored in the read only memory (ROM) 14B and is read by the random access memory (RAM) 14C, and controls the entire analysis apparatus 20. In the ROM 14B, the program and data for causing the CPU 14A to operate are stored. The RAM 140 provides a work area for the CPU 14A, and temporarily stores various pieces of data and various programs. The electrically erasable programmable read only memory (EEPROM) 14D stores various pieces of setting data. The interface circuit 14E controls communication between the CPU 14A and various circuits.

Control lines of the first imaging section 100A, the second imaging section 100B, the light source 12, a first pump 15A, and a second pump 15B are connected to the interface circuit 14E, and these devices are controlled by control signals from the controller 14. The first pump 15A supplies a sheath fluid to the flow cell 13A via a first supply pipe 132A, and the second pump 15B supplies a sample to the flow cell 13A via a second supply pipe 133A. The sheath fluid is a fluid for controlling the flow of the sample in the flow cell 13A, and a physiological saline solution is used in the case where the sample is, e.g., urine. Note that a solution other than the physiological saline solution may be used as the sheath fluid.

The branch section 102 causes light from the flow cell 13A to branch in two or more directions. The branch section 102 is a beam splitter such as, e.g., a half mirror, and causes light to branch in two directions by transmitting part of light having passed through the objective lens 101 and reflecting the remaining light. Subsequently, the light caused to branch and having passed through the branch section 102 is incident on the first lens group 103A, and is then incident on the imaging surface of the image sensor of the first camera 105A. That is, the light is used for imaging in the first imaging section 100A. On the other hand, the light reflected by the branch section 102 is incident on the second lens group 103B, and is then incident on the imaging surface of the image sensor of the second camera 105B. That is, the light s used for imaging in the second imaging section 100B. An optical path of light between the branch section 102 and the first camera 105A is referred to as a first optical path, and an optical path of light between the branch section 102 and the second camera 105B is referred to as a second optical path. In addition, as shown in FIG. 1, the branch section 102 is disposed on an optical axis 11B of the objective lens 101.

In FIG. 1, an optical axis of the first optical path is indicated by 111A, and an optical axis of the second optical path is indicated by 111B.

The mask 104 is disposed between the branch section 102 and the first lens group 103A (i.e., the mask 104 is inserted into the first optical path). The mask 104 is formed by making a circular hole in a plate, and is disposed at a position that allows the optical axis 111A of the first lens group 103A to match the central axis of the hole of the mask 104 and is orthogonal to the optical axis 111A of the first optical path. The mask 104 functions as a diaphragm that reduces the amount of light traveling toward the first camera 105A by blocking part of the light in the first optical path. The depth of field of the first camera 105A is increased by the mask 104.

Figure 2:
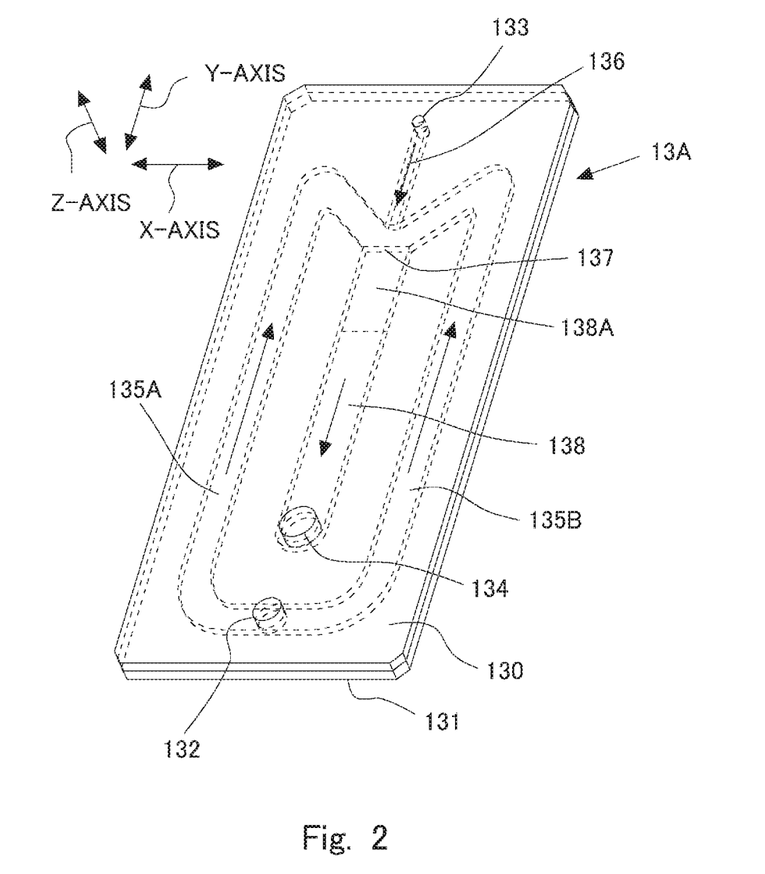
FIG. 2 is a view showing the schematic configuration of a flow cell.

FIG. 2 is a view showing the schematic configuration of the flow cell 13A. The flow cell 13A is formed by joining a first plate 130 and a second plate 131 together (e.g., thermocompression bonding). FIG. 2 is a view in which the flow cell 13A is viewed from the side of the first plate 130. Note that it is assumed that the width direction of the flow cell 132A shown in FIG. 2 is an X-axis direction in a Cartesian coordinate system, the length direction thereof is a Y-axis direction, and the thickness direction thereof is a Z-axis direction. The sample to be imaged flows in the Y-axis direction in the flow cell 13A. The optical axis 11B of the objective lens 101 is disposed in the Z-axis direction.

As the material of the flow cell 13A, it is possible to use a material having visible light permeability of 90% or more such as, e.g., acrylic resin (PMMA), cycloolefin polymer (COP), polydimethylsiloxane (PDMS), polypropylene (PP), or quartz glass.

The first plate 130 is provided with a first supply port 132 for supplying the sheath fluid, a second supply port 133 for supplying the sample, and a discharge port 134 for discharging the sheath fluid and the sample. Each of the first supply port 132, the second supply port 133, and the discharge port 134 passes through the first plate 130. The first supply port 132 is provided at one end side in the longitudinal direction of the first plate 130, the second supply port 133 is provided at the other end side in the longitudinal direction of the first plate 130, and the discharge port 134 is provided between the first supply port 132 and the second supply port 133 in the longitudinal direction of the first plate 130.

The first supply port 132, the second supply port 133, and the discharge port 134 are caused to communicate with each other using passages 135A, 135B, 136, and 138. Each of the passages 135A, 135B, 136, and 138 is formed so as to be depressed from the surface of the joined surface side of the first plate 130 such that the cross section thereof is rectangular. In addition, the cross section of each of the passages 135A, 135B, 136, and 138 is formed so as to be larger in a width direction (the X-axis direction in FIG. 2) than in a depth direction (the Z-axis direction in FIG. 2). When the first plate 130 and the second plate 131 are joined together, the second plate 131 serves as a wall material that forms the passages 135A, 135B, 136, and 138.

The first passage 135A and the second passage 135B are connected to the first supply port 132. The first passage 135A and the second passage 135B extend in clockwise and counterclockwise directions toward the side of the second supply port 133 along the outer edge of the first plate 130, and join together at a joining section 137. In addition, the third passage 136 is connected to the second supply port 133, and joins the first passage 135A and the second passage 135B at the joining section 137. The joining section 137 is connected to the discharge port 134 via the fourth passage 138. The fourth passage 138 is formed with a tapered section 138A that is formed into a tapered shape in which the depth of the fourth passage 138 (the length in the thickness direction of the first plate 130 (the Z-axis direction)) is gradually reduced toward the discharge port 134 from the joining section 137. The tapered section 138A is inclined, e.g., 2° to 8°.

The first supply pipe 132A shown in FIG. 1 is connected to the first supply port 132, the second supply pipe 133A shown in FIG. 1 is connected to the second supply port 133, and a discharge pipe (not shown) is connected to the discharge port 134. The sheath fluid supplied to the first supply port 132 from the first supply pipe 132A flows in the first passage 135A and the second passage 135B. The sample supplied to the second supply port 133 from the second supply pipe 133A flows in the third passage 136. Subsequently, the sheath fluid and the sample join together at the joining section 137, flow in the fourth passage 138, and are discharged to the discharge pipe from the discharge port 134.

Figure 3:
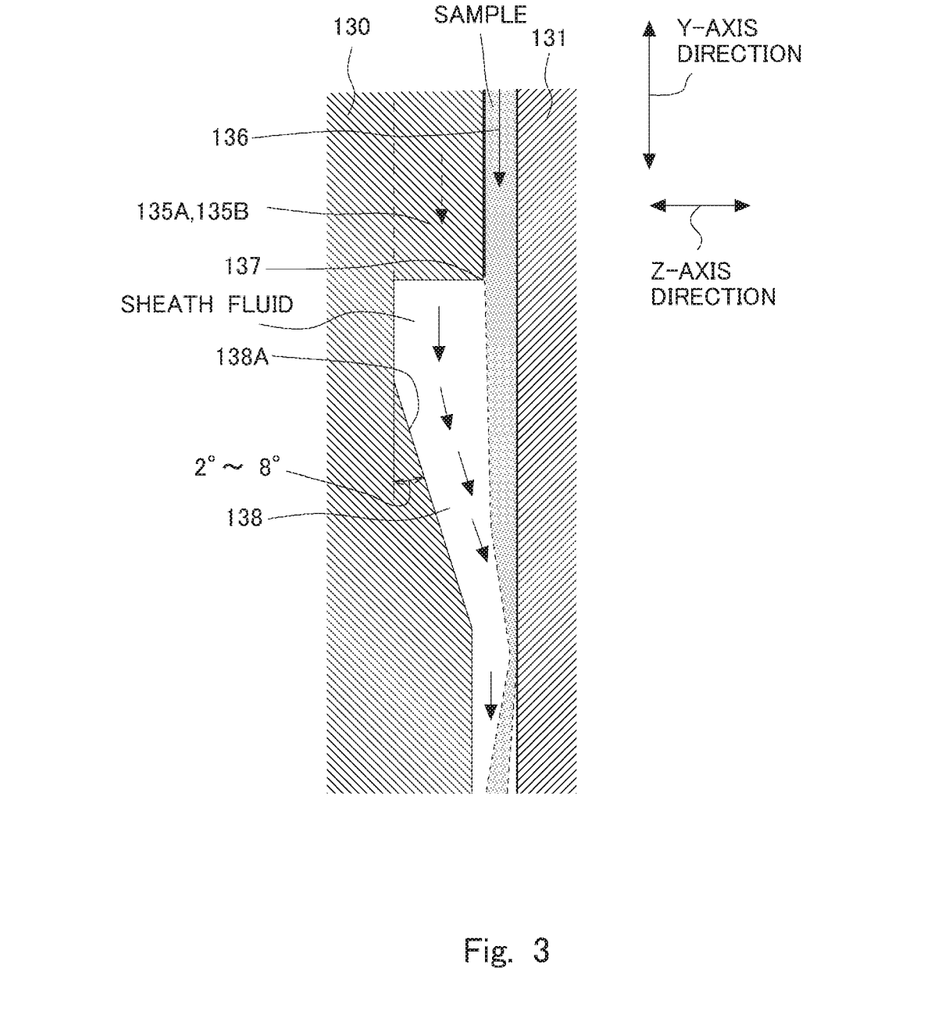
FIG. 3 is a view showing the schematic configuration in the vicinity of a joining section and a tapered section.

FIG. 3 is a view showing the schematic configuration in the vicinity of the joining section 137 and the tapered section 138A. In the joining section 137, the third passage 136 is disposed so as to be close to the second plate 131, and the sample flows along the second plate 131 in the joining section 137.

Figure 4:
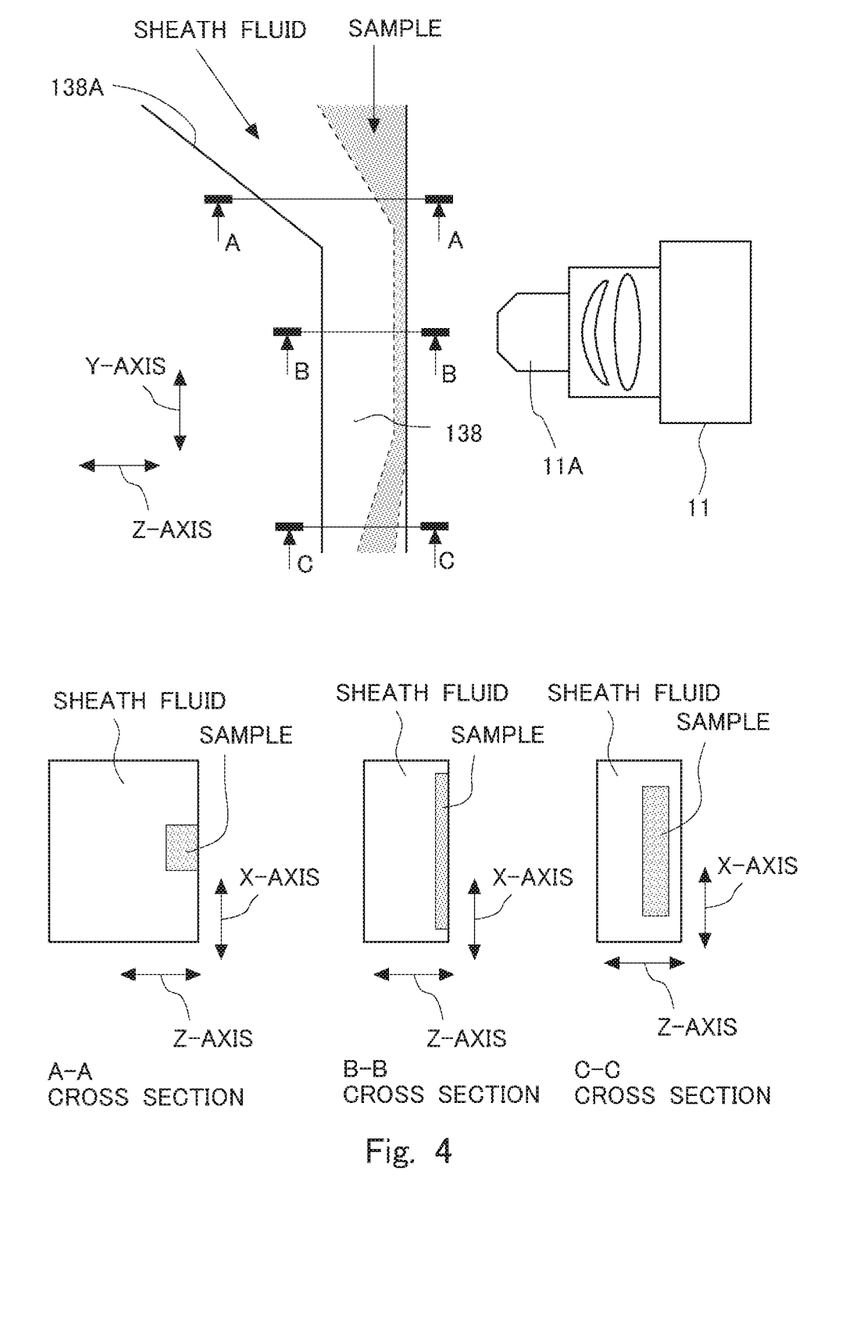
FIG. 4 is a view showing the distributions of a sheath fluid and a sample that flow an a fourth passage.

FIG. 4 is a view showing the distributions of the sheath fluid and the sample that flow in the fourth passage 138. After the sheath fluid and the sample are supplied separately from the upper side in FIG. 4, the sheath fluid and the sample join together at the joining section 137. Immediately after the joining of the sheath fluid and the sample at the joining section 137, the sample in the sheath fluid is concentrated on a relatively narrow area on the side of the wall surface of the second plate 131 (see an A-A cross section in FIG. 4). Thereafter, when the sample flows in the tapered section 138A, the sample is pushed by the sheath fluid, and spreads flatly along the wall surface in the vicinity of the wall surface of the second plate 131 (see a B-B cross section in FIG. 4). When the sample further flows, the sample moves away from the wall surface of the second plate 131 due to the tubular pinch effect, and is lifted toward the direction of center of the fourth passage 138 (see a C-C cross section in FIG. 4).

The distribution of a tangible component is influenced by the distribution of a sample fluid in the sheath fluid. By performing imaging at a position that allows imaging of more tangible components, it is possible to increase accuracy in the analysis of the tangible component. As shown in the cross-sectional views in FIG. 4, in the flow cell 13A, the flow of the sample changes depending on the position in the Y-axis direction. At the position in the C-C cross section in FIG. 4, the width of the sample in the Z-axis direction is larger than the width thereof at the position in the B-B cross section. At the position in the C-C cross section in FIG. 4, the tangible components in the sample are distributed so as to spread in the Z-axis direction, and hence the position in the C-C cross section is not suitable for imaging of the tangible components.

On the other hand, at the position in the B-B cross section in FIG. 4, the sheath fluid flows so as to push the sample against the second plate 131 from above, and the sample is crushed by the sheath fluid to thinly spread. Consequently, at the position in the B-B cross section in FIG. 4, the tangible components in the sample do not spread in the Z-axis direction, and the tangible components are easily brought into focus. Note that the sheath fluid and the sample fluid form laminar flows, and are scarcely mixed. This position in the B-B cross section is the position in the Y-axis direction suitable for the imaging of the tangible components, and hence the sample is imaged at this position in the Y-axis direction. This position is referred to as an imaging position, and the optical axis 11B of the objective lens 101 is set to this imaging position.

In the first imaging section 100A, the mask 104 is inserted into the first optical path, and the amount of light traveling toward the first camera 105A is reduced (a numerical aperture is reduced). On the other hand, a diaphragm corresponding to the mask 104 is not provided in the second optical path. Consequently, the depth of field of an image captured by the first imaging section 100A is larger than the depth of field of an image captured by the second imaging section 100B. In contrast to this, the resolution of the second imaging section 100B is higher than the resolution of the first imaging section 100A. Note that the diameter of the hole formed in the mask 104 is set such that the desired numerical aperture is obtained in the first imaging section 100A. The desired numerical aperture can be set in accordance with the depth of field required of the first imaging section 100A.

The depth of field of the second imaging section 100B is set such that the depth of field of the image captured by the second imaging section 100B is included in the depth of field of the image captured by the first imaging section 100A.

The first camera 105A and the second camera 105B simultaneously capture still images of the tangible component in the sample that flows in the flow cell 13A. The imaging is magnification imaging, and the lighting time of the light source 12 and the imaging time (exposure time) of each of the first camera 105A and the second camera 105B are synchronized by the controller 14. Parallel light enters the flow cell 13A from the light source 12. In the imaging, the light source 12 is lighted at least once. The lighting time of the light source 12 depends on the speed of flow of the sample, and is set to, e.g., 0.1 to 10 μsec such that a motion blur falls within a permissible range. The number of tangible components included in one image may be increased by causing the light source 12 to emit light a plurality of times in one exposure. By imaging more tangible components, it is possible to further increase the accuracy in the analysis of the tangible component. The blinking timing of the light source 12 in this case is determined in consideration of the relationship between the speed of flow of the sample and the lighting time of the light source 12 such that the same sample is not imaged. As the light source 12, it is possible to use, e.g., a xenon lamp or a white LED. However, the present disclosure is not limited thereto, and it is also possible to use other light sources. A plurality of the images described above are captured.

By causing the optical path to branch into the first optical path and the second optical path at the branch section 102 and providing the mask 104 only in the first optical path, when an image of light from the light source 12 having passed through the flow cell 13A is captured by each of the first imaging section 100A and the second imaging section 100B simultaneously, it is possible to acquire two images that have the same angle of view and are different in characteristic such as the depth of field or the resolution. The image captured by the first imaging section 100A having the depth of field larger than that of the second imaging section 100B has a wide range in which the tangible component is in focus, and hence the image is suitable for determining the positions and number of the tangible components. On the other hand, the image captured by the second imaging section 100B having the resolution higher than that of the first imaging section 100A is suitable for morphological observation of a cell nucleus or the like and more minute classification of the tangible components that are classified according to the type.

The CPU 14A performs imaging of the sample flowing in the flow cell 13A that uses the first imaging section 100A and the second imaging section 100B, grasps the positions, sizes, and number of the tangible components from the image captured by the first imaging section 100A, determines a cut-out size of an image from the grasped size of the tangible component, and generates a cut-out image. The cut-out image is an image obtained by comparing a background image with the captured image, surrounding a part having a difference by using a square, and cutting out an image in the square.

Prior to the generation of the cut-out image, the CPU 14A creates an image obtained by averaging pixel values of individual pixels as a background image for each image by using stored image data. The pixel value may be the brightness or RGB values of each pixel. The CPU 14A executes a program (cut-out process) stored in the ROM 14B, and the cut-out image is thereby generated. The cut-out image is stored in the RAM 14C together with its cut-out position and cut-out size. For example, the CPU 14A generates the cut-out image for each of the tangible components included in the captured image.

The CPU 14A generates at cut-out image (hereinafter referred to as a second cut-out image) by cutting out an image having the same cut-out position and the same cut-out size as those of a cut-out image (hereinafter referred to as a first cut-out image) generated from the image captured by the first imaging section 100A from the image captured by the second imaging section 100B. Subsequently, the CPU 14A causes the RAM 14C to store the first cut-out image and the second cut-out image in association with each other. The first cut-out image and the second cut-out image are used for various analyses by the CPU 14A.

It is possible to recognize the tangible component from the image captured by the first imaging section 100A, and hence it is not necessary to perform a process for recognizing the tangible component from the image captured by the second imaging section 100B. Thus, the positions, sizes, and number of the tangible components are grasped based on the image captured by the first imaging section 100A, and the minute morphological observation of the tangible component is performed based on the image captured by the second imaging section 100B. With this morphological observation, it is possible to analyze and classify the tangible components with high accuracy.

Figure 5:
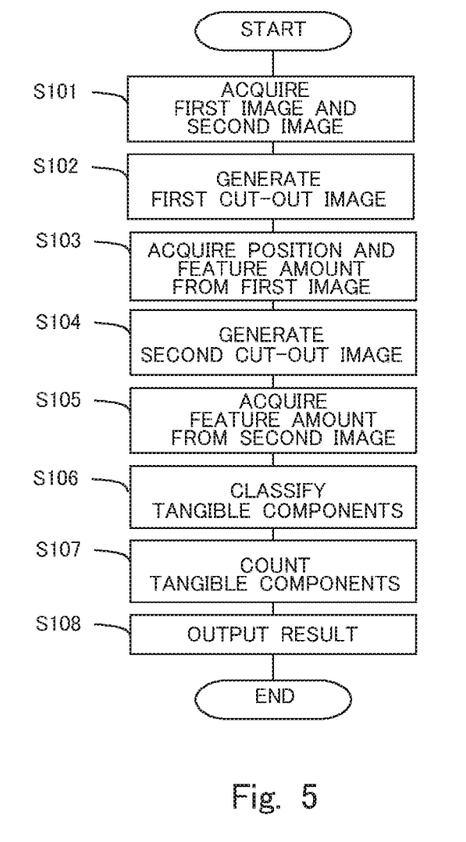
FIG. 5 is a flowchart showing a procedure for classifying tangible components.

FIG. 5 is a flowchart showing a procedure for classifying the tangible components. The present flowchart is executed by the CPU 14A.

In Step S101, the CPU 14A acquires the images captured by the first imaging section 100A and the second imaging section 100B. Hereinafter, the image captured by the first imaging section 100A is referred to as a first image, and the image captured by the second imaging section 100B is referred to as a second image.

When the process in Step S101 is completed, the procedure proceeds to Step S102 in which the CPU 14A cuts out the tangible component from the first image to generate the first cut-out image, and causes the RAM 14C to store the first cut-out image.

When the process in Step S102 is completed, the procedure proceeds to Step S103 in which the CPU 14A acquires the position information and the feature amount of the first cut-out image. The position information and the feature amount of the first cut-out image are stored in the RAM 14C in association with the first cut-out image. Examples of the feature amount include color, shape, and size. A program pre-stored in the ROM 14B is used for the acquisition of the feature amount.

When the process in Step S103 is completed, the procedure proceeds to Step S104 in which the CPU 14A cuts out the tangible component from the second image to generate the cut-out image (the second cut-out image). The second cut-out image is generated by cutting out the image having the same position and the same size as those of the first cut-out image, based on the position information of each of a plurality of the first cut-out images.

When the process in Step S104 is completed, the procedure proceeds to Step S105 in which the CPU 14A acquires the feature amount of the second cut-out image. The feature amount of the second cut-out image is stored in the RAM 14C in association with the second cut-out image.

When the process in Step S105 is completed, the procedure proceeds to Step S106 in which the CPU 14A performs classification of the tangible components based on the feature amounts acquired in Step S103 and Step S105. A program pre-stored in the ROM 14B is used for the classification. For example, the CPU 14A performs the classification of the tangible components by comparing the feature amount of the first cut-out image or the feature amount of the second cut-out image with the feature amount for each tangible component that is pre-stored in the ROM 14B.

When the process in Step S106 is completed, the procedure proceeds to Step S107 in which the CPU 14A counts the tangible components for each type of the tangible component classified in Step S106, and the procedure then proceeds to Step S108 in which the result of the count in Step S107 is output. The CPU 14A may perform various analyses based on the result of the count.

Thus, it is possible to determine the positions and number of the tangible components based on the first cut-out image, and increase the accuracy in the analysis of the tangible component by performing the classification of the tangible components based on the second cut-out image. In addition, when the first image and the second image that are images having different characteristics are acquired, the acquisition of the images requires only one light source 12 and one objective lens 101. Further, by simultaneously capturing the first image and the second image that have the same angle of view, it is not necessary to set delay time between the capturing of the first image and the capturing of the second image, and hence it is possible to simplify the device and control. With this, it is possible to implement detection and analysis of the tangible component in the sample at lower cost.

Note that the mask 104 is used as the optical member that reduces the amount of light in the above description, but it is also possible to use an optical slit instead of the mask 104.

Second Embodiment

The depth of field and resolution of the first image are changed by using the mask 104 in the first embodiment. In contrast, in a second embodiment, instead of disposing the mask 104 in the first imaging section 100A, an optical filter 106 is disposed in the second imaging section 100B. Hereinbelow, points different from the first embodiment will be mainly described.

Figure 6:
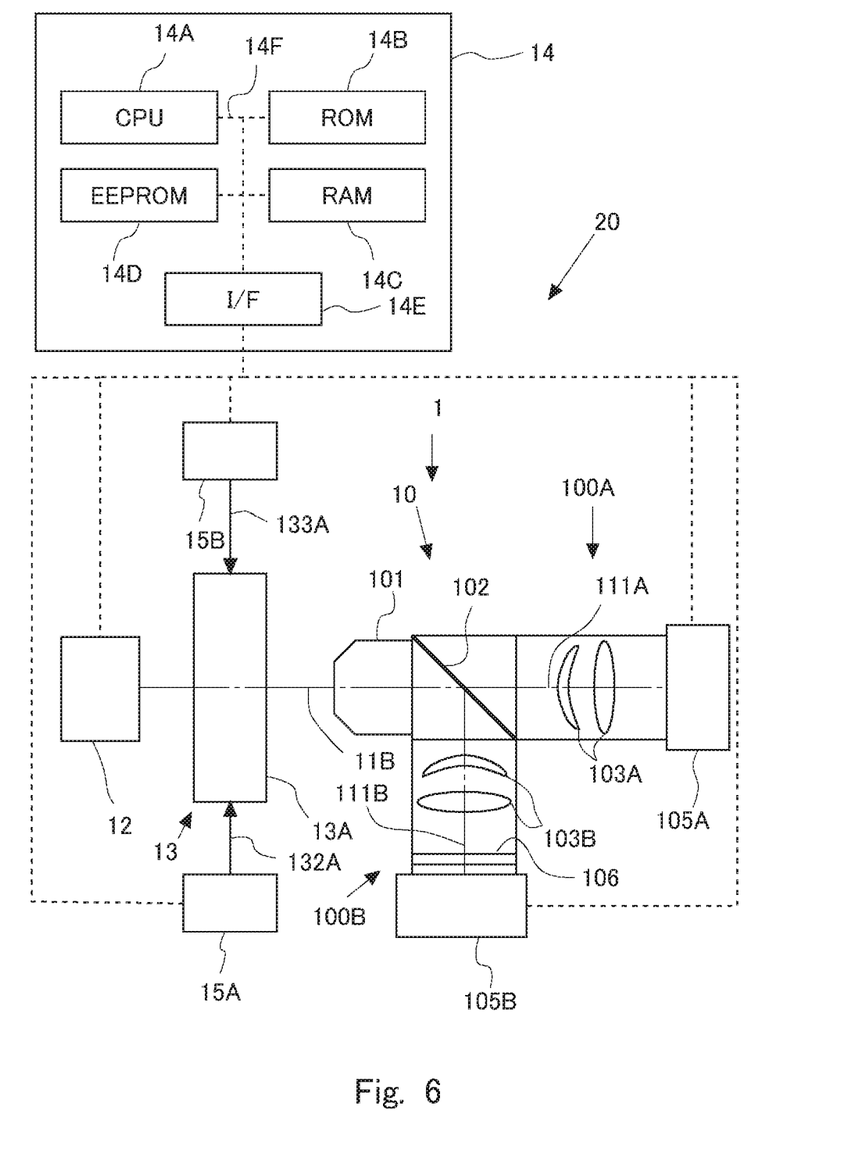
FIG. 6 is a view showing the schematic configuration of the analysis apparatus according to a second embodiment.

FIG. 6 is a view showing the schematic configuration of the analysis apparatus 20 according to the second embodiment. The mask 104 is not provided in the first imaging section 100A. In the second imaging section 100B, the optical filter 106 is provided between the second camera 105B and the second lens group 103B. The optical filter 106 transmits, e.g., only light having a predetermined wavelength.

A description will be given of, e.g., the case where a red blood cell is detected as a sediment component in a urine sample. The red blood cell absorbs green, and hence it is possible to image the tangible component other than the red blood cell in the sample by using the second camera 105B by providing the optical filter 106 that transmits green. At this point, in an image captured by the first camera 105A simultaneously, the tangible components including the red blood cell are imaged. In the case where the tangible component that can be recognized in the first image cannot be recognized in the second image, the tangible component can be classified as the red blood cell. Consequently, it is possible to distinguish the red blood cell from a similar component to the red blood cell such as a calcium oxalate crystal with high accuracy. It is possible to appropriately select the transmission wavelength of the optical filter 106 in accordance with the sample fluid and the tangible component. The optical filter 106 can be easily replaced with another optical filter in accordance with the tangible component to be distinguished.

Thus, by using the optical filter 106, the classification of the tangible component in the sample is easily allowed. The CPU 14A generates the first cut-out image from the first image, generates the second cut-out image having the same position and the same size as those of the first cut-out image from the second image, and performs the classification of the tangible components by comparing the second cut-out image with the first cut-out image.

Figure 7:
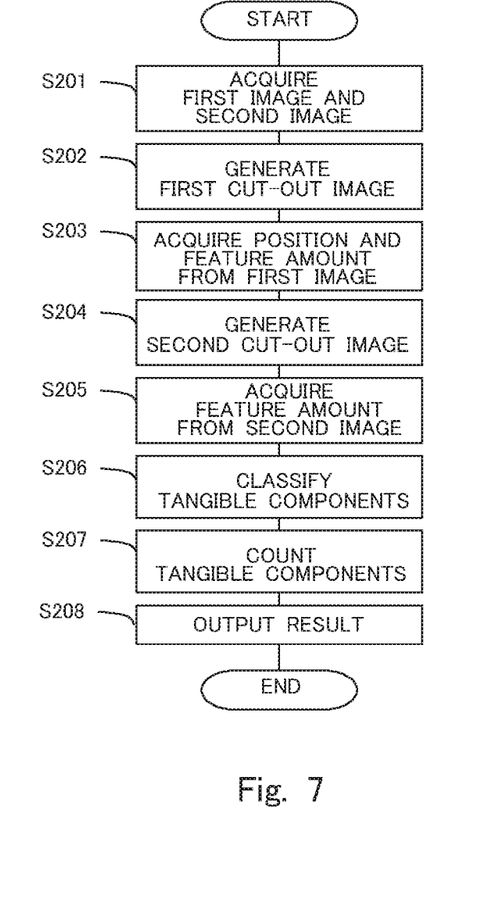
FIG. 7 is a flowchart showing the procedure for classifying the tangible components.

FIG. 7 is a flowchart showing the procedure for classifying the tangible components. The present flowchart is executed by the CPU 14A.

In Steps S201 to S205, the CPU 14A executes the same processes as those in Steps S101 to S105 shown in FIG. 5.

When the process in Step S205 is completed, the procedure proceeds to Step S206 in which the CPU 14A performs the classification of the tangible components based on the feature amounts acquired in Step S203 and Step S205. For example, in the case where the tangible component can be recognized in the first cut-out image but the tangible component cannot be recognized in the second cut-out image at the corresponding same position, the tangible component is classified as the tangible component corresponding to light having a wavelength of which passage is not allowed by the optical filter 106. A program pre-stored in the ROM 14B is used for the classification.

When the process in Step S206 is completed, the procedure proceeds to Step S207 in which the CPU 14A counts the tangible components classified in Step S206, and the procedure then proceeds to Step S208 in which the result of the count in Step S207 is output. The CPU 14A may perform various analyses based on the result of the count. In addition, the CPU 14A may analyze the tangible component based on the first cut-out image subjected to the classification, and may also analyze the tangible component based on, among the second cut-out images, the image in which the tangible component can be recognized.

Thus, by performing the classification of the tangible components based on the first cut-out image and the second cut-out image, it is possible to increase the accuracy in the analysis of the tangible component. In addition, by inserting the optical filter 106 into one of the optical paths, wavelength characteristics of light incident on the first imaging section 100A are made different from those of light incident on the second imaging section 100B. As a result, when the first image and the second image that are images having different characteristics are acquired, the acquisition of the images requires only one light source 12 and one objective lens 101. In addition, by imaging the same view area simultaneously, it is not necessary to set the delay time between the capturing of the first image and the capturing of the second image, and hence it is possible to simplify the device and control. With this, it is possible to implement the detection and analysis of the tangible component in the sample at lower cost.

Third Embodiment

The first imaging section 100A and the second imaging section 100B are provided as the imaging sections in each of the first embodiment and the second embodiment, but it is also possible to provide more imaging sections. In addition, it is possible to combine the mask 104 according to the first embodiment with the optical filter 106 according to the second embodiment. Further, it is also possible to provide a plurality of masks having different hole diameters in different imaging sections respectively. Furthermore, it is also possible to provide a plurality of optical filters having different wavelengths of light of which passage is allowed in different imaging sections respectively. Additionally, it is also possible to provide a slit. Hereinbelow, a description will be given of a configuration in which three imaging sections are provided.

Figure 8:
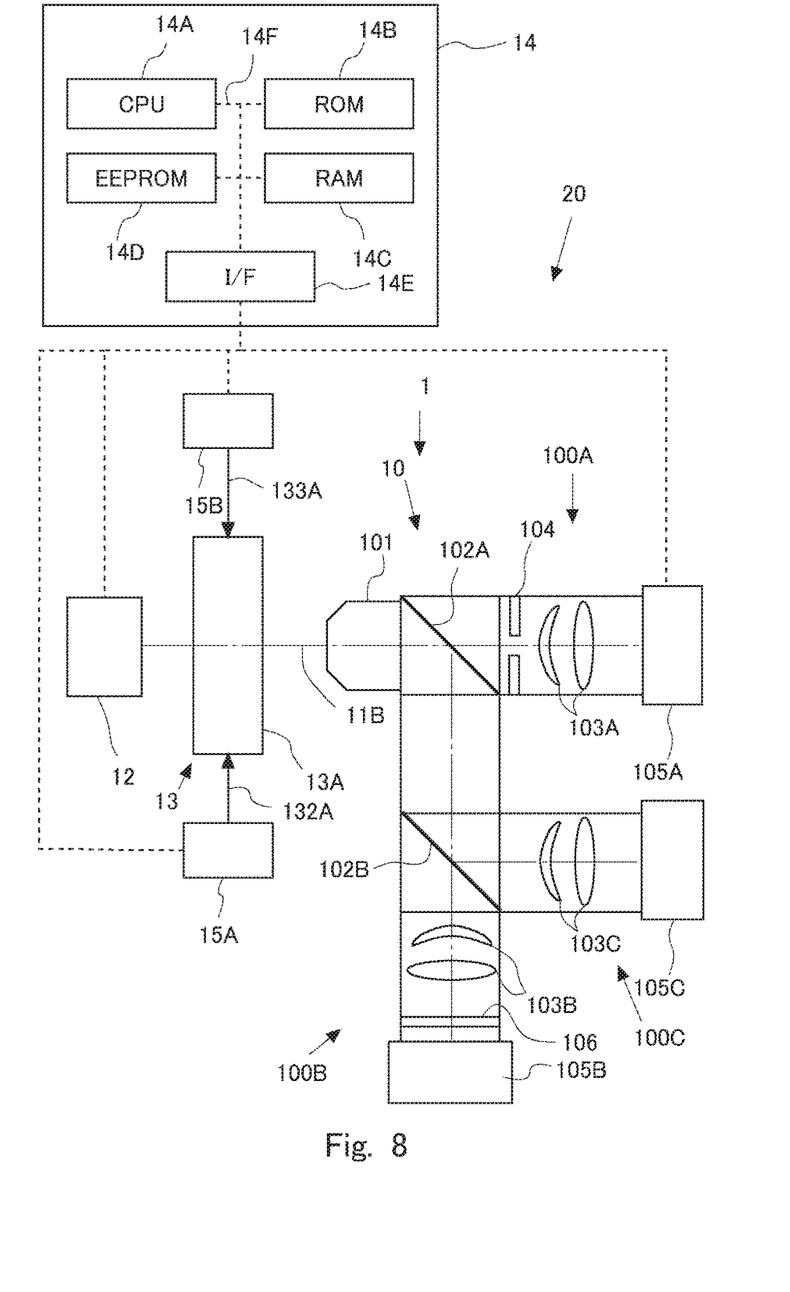
FIG. 8 is a view showing the schematic configuration of the analysis apparatus according to a third embodiment.

FIG. 8 is a view showing the schematic configuration of the analysis apparatus 20 according to a third embodiment. The imaging device 1 includes the first imaging section 100A, the second imaging section 100B, and a third imaging section 100C. In addition, the imaging device 1 includes a first branch section 102A and a second branch section 102B. The first imaging section 100A includes the objective lens 101, the first branch section 102A, the first lens group 103A, the mask 104, and the first camera 105A. The second imaging section 100B includes the objective lens 101, the first branch section 102A, the second branch section 102B, the second lens group 103B, the optical filter 106, and the second camera 105B. The third imaging section 100C includes the objective lens 101, the first branch section 102A, the second branch section 102B, a third lens group 103C, and a third camera 105C.

Each of the first lens group 103A, the second lens group 103B, and the third lens group 103C includes an eyepiece and, in some cases, further includes an imaging lens. The objective lens 101 and the light source 12 are shared by the first imaging section 100A, the second imaging section 100B, and the third imaging section 100C.

Each of the first branch sect on 102A and the second branch section 102B is a beam splitter such as, e.g., a half mirror. The first branch section 102A causes light to branch in two directions by transmitting part of light having passed through the objective lens 101 and reflecting the remaining light. The light passing through the first branch section 102A is incident on the first lens group 103A, and is used for imaging in the first imaging section 100A.

The second branch section 102B causes the light to further branch in two directions by transmitting part of the light reflected by the first branch section 102A and reflecting the remaining light. The light passing through the second branch section 102B is incident on the second lens group 103B, and is used for imaging in the second imaging section 100B. The light reflected by the second branch section 102B is incident on the third lens group 103C, and is used for imaging in the third imaging section 100C.

The first imaging section 100A, the second imaging section 100B, the third imaging section 100C, the light source 12, the first pump 15A, and the second pump 15B are connected to the controller 14, and these devices are controlled by the controller 14.

The CPU 14A simultaneously captures images having the same angle of view by using the first imaging section 100A, the second imaging section 100B, and the third imaging section 100C. Subsequently, the CPU 14A grasps the positions, sizes, and number of the tangible components from the image captured by the first imaging section 100A, performs the classification of the tangible components in the sample from the images captured by the second imaging section 100B and the third imaging section 100C, and performs the minute morphological observation of the tangible component based on the image captured by the third imaging section 100C. The hole diameter of the mask 104 and the type of the optical filter 106 are appropriately selected in accordance with the type of the tangible component and the analysis content. In the analysis of the tangible component, the same processes as those in the flowchart shown in FIG. 5 or FIG. 7 are appropriately performed.

Thus, even in the case where three or more imaging sections are provided, it is possible to capture the images having the same angle of view simultaneously, and hence it is possible to simplify the device and control. With this, it is possible to implement the detection and analysis of the tangible component in the sample at lower cost.

Note that, in the above embodiments, for example, the optical member that reduces the amount of light incident on the first camera 105A is provided in the first imaging section 100A, and the optical filter 106 is provided in the second imaging section 100B, but it will be easily appreciated that it is only necessary to provide the optical member or the optical filter in one of the imaging sections.

In addition, in each of the above embodiments, the description has been made by using, as an example, the mode in which the sample having passed through the tapered section 138A of the flow cell 13A is in contact with the wall surface of the flow cell 13A. However, the structure of the flow cell and the flow of the sample are not limited only to this mode. For example, it is also possible to use the flow cell structured such that, after the sample passes through the tapered section 138A of the flow cell 13A, the sample is surrounded by the sheath fluid, and is thinly spread at the center of the sheath fluid. Note that the first camera 105A and the second camera 105B used in the above embodiments are not particularly limited, and it will be easily appreciated that the same camera may be used, or cameras having different performance capabilities may also be used.

Fourth Embodiment

The present embodiment will be described by using FIG. 1. In the present embodiment, the number of pixels of the image sensor of the first camera 105A of the first imaging section 100A (hereinafter also referred to as the number of pixels of the first camera 105A or the number of pixels of the first imaging section 100A) is smaller than the number of pixels of the image sensor of the second camera 105B of the second imaging section 100B (hereinafter also referred to as the number of pixels of the second camera 105B or the number of pixels of the second imaging section 100B). The mask 104 is provided in the first imaging section 100A, and hence the depth of field of the image captured by the first imaging section 100A is larger than the depth of field of the image captured by the second imaging section 100B. On the other hand, the resolution of the second imaging section 100B is higher than the resolution of the first imaging section 100A. In addition, the angle of view of the first imaging section 100A is the same as that of the second imaging section 100B.

Herein, an appropriate number of pixels of the camera corresponding to the resolution of the imaging section are present. Consequently, when the camera having the number of pixels that is not selected on the basis of the resolution of the imaging section is used, there are cases where the number of pixels becomes too small (too few pixels) or too large (too many pixels) relative to the resolution. That the number of pixels becomes too large (too many pixels) relative to the resolution denotes a state in which the size of one pixel is too small relative to the resolution. That the number of pixels becomes too small (too few pixels) relative to the resolution denotes a state in which the size of one pixel is too large relative to the resolution. When the camera having the number of pixels corresponding to the resolution of the second imaging section 100B is used in the first imaging section 100A, there are cases where the number of pixels becomes unnecessarily large relative to the resolution in the first imaging section 100A. On the other hand, when the camera having the number of pixels corresponding to the resolution of the first imaging section 100A is used in the second imaging section 100B, there are cases where the number of pixels becomes too small relative to the resolution in the second imaging section 100B.

To cope with this, by making the number of pixels of the first camera 105A smaller than the number of pixels of the second camera 105B, it is possible to dispose the cameras having the numbers of pixels corresponding to the respective resolutions of the first imaging section 100A and the second imaging section 100B. Note that examples of the combination of the number of pixels of the first camera 105A and the number of pixels of the second camera 105B conceivably include (1) a combination in which the number of pixels of the first camera 105A is set to 2 to 3 million, and the number of pixels of the second camera 105B is set to 18 million to 20 million, (2) a combination in which the number of pixels of the first camera 105A is set to 2 million to 3 million, and the number of pixels of the second camera 105B is set to 5 million to 12 million, and (3) a combination in which the number of pixels of the first camera 105A is set to 1 million or less, and the number of pixels of the second camera 105B is set to 2 million to 3 million. However, the combination of the numbers of pixels is not limited thereto. For example, the number of pixels of the first camera 105A may be any number thereof suitable for determining the positions and number of the tangible components. On the other hand, the number of pixels of the second camera 105B may be any number thereof suitable for the minute morphological observation of the tangible component. By selecting the numbers of pixels mentioned above, the number of pixels of the first camera 105A becomes smaller than the number of pixels of the second camera 105B.

In general, the smaller the number of pixels of a camera is, the lower the price of the camera is. Consequently, by making the number of pixels of the first camera 105A smaller than the number of pixels of the second camera 105B, it is possible to reduce the price of the first camera 105A, and thereby reduce the cost of the entire analysis apparatus 20. In addition, in general, the smaller the number of pixels is, the lower the load of image processing is. Consequently, by making the number of pixels of the first camera 105A smaller than the number of pixels of the second camera 105B, it is possible to increase the speed of processing of the image captured by the first camera 105A, and thereby increase the processing speed of the entire analysis apparatus 20.

What is claimed is:

1. An analysis apparatus comprising:
    a flow cell which includes a flow path for a sample containing a tangible component;
    a beam splitter configured to cause light having passed through the flow path to branch at least to a first optical path and a second optical path;
    a first camera and a second camera configured to capture images of the sample in the flow path by using the light in the first optical path and the light in the second optical path; and
    a processor configured to process the captured images, wherein the first camera and the second camera are further configured to capture images that have the same angle of view but have different characteristics; and
    a depth of field of the first camera is larger than a depth of field of the second camera.

2. The analysis apparatus according to claim 1, wherein the processor is further configured to perform a process for generating position information of the tangible component from the image captured by the first camera, and cutting out an image of the tangible component from the image captured by the second camera, based on the position information.

3. The analysis apparatus according to claim 1, wherein the processor is further configured to perform a process for detecting the tangible component by comparing the image captured by the first camera by using the light that branches to the first optical path from the beam splitter, with the image captured by the second camera by using the light that branches to the second optical path from the beam splitter.

4. The analysis apparatus according to claim 1, wherein the first camera includes an optical member that reduces an amount of incident light.

5. The analysis apparatus according to claim 1, wherein the second camera includes an optical filter that transmits light having a predetermined wavelength, and light incident on the first camera is different in wavelength characteristic from light incident on the second camera.

6. The analysis apparatus according to claim 1, wherein the number of pixels of the first camera is smaller than the number of pixels of the second camera.

7. An analysis method comprising the steps of:
    irradiating a flow cell which includes a flow path for a sample containing a tangible component, with light from a light source;
    causing light having passed through the flow path to branch at least to a first optical path and a second optical path;
    capturing a first image serving as an image of the sample in the flow path by using the light in the first optical path;
    capturing a second image that has the same angle of view as that of the first image but has a characteristic different from that of the first image by using the light in the second optical path;
    cutting out a first cut-out image including the tangible component from the first image and determining position information of the first cut-out image;
    cutting out a second cut-out image of the tangible component from the second, image based on the position information; and
    detecting the tangible component by comparing the first cut-out image with the second cut-out image.

8. The analysis method according to claim 7, wherein a depth of field of the first image is larger than a depth of field of the second image.

9. The analysis apparatus according to claim 1, wherein the processor is further configured to:
    determine the number of the tangible components based on the image captured by the first camera; and
    classify the tangible components according to the type based on the image captured by the second camera.

10. The analysis method according to claim 7, further comprising the steps of:
    determining the number of the tangible components based on the image captured by the first camera; and
    classifying the tangible components according to the type based on the image captured by the second camera.

* * * * *